G. E. PURPLE.
BELT FASTENING.
APPLICATION FILED NOV. 11, 1912.

1,212,258.

Patented Jan. 16, 1917.

Witnesses:
Fred Palm
Chas. L. Goss

Inventor:
George E. Purple,
By Henderson Bottum Fawsett & Bottum
Attorneys.

UNITED STATES PATENT OFFICE.

GEORGE E. PURPLE, OF LA GRANGE, ILLINOIS, ASSIGNOR TO FLEXIBLE STEEL LACING COMPANY, OF CHICAGO, ILLINOIS, A CORPORATION OF ILLINOIS.

BELT-FASTENING.

1,212,258.

Specification of Letters Patent.

Patented Jan. 16, 1917.

Application filed November 11, 1912. Serial No. 730,555.

*To all whom it may concern:*

Be it known that I, GEORGE E. PURPLE, a citizen of the United States, residing at La Grange, in the county of Cook and State of Illinois, have invented certain new and useful Improvements in Belt-Fastenings, of which the following is a specification, reference being had to the accompanying drawing, forming a part thereof.

This invention relates to separable hinged fastenings for machinery belting, and more particularly to hinge pins for such fastenings, and its main objects are to avoid wear between the hinge pin and loop members of the fastening; to facilitate connection and disconnection of the loop members which are attached to the belt ends; to prevent accidental separation of the loop members even if the pin is broken; and generally to improve the construction and operation of this class of fastenings.

It consists in the construction, arrangement and combination of parts as hereinafter particularly described and defined in the appended claims.

In the accompanying drawing like characters designate the same parts in the several figures.

Figure 1:
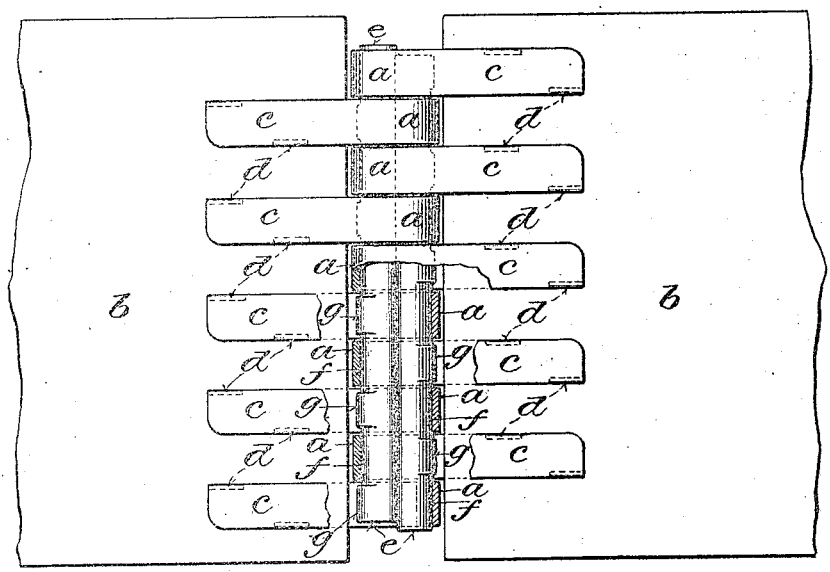
Figure 2:
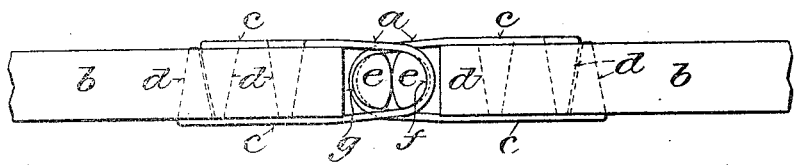
Figure 3:
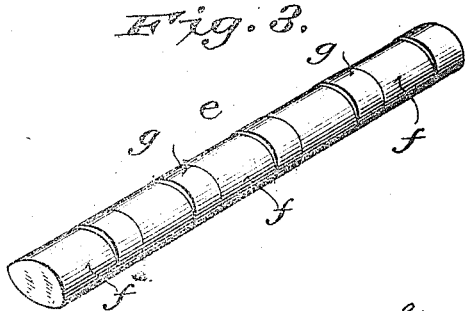

Figure 1 is a face view of the ends of the belt, with a fastening embodying the invention as applied thereto, a part of the hinge loops being broken away to show the construction of the hinge pin; Fig. 2 is an edge view of the belt ends and fastening, showing the hinge pin in end elevation; and Fig. 3 is a perspective view of one segment of the hinge pin.

The fastening comprises spaced hinge loops $a$, attachable alternately to the ends of a belt $b$, so that the loops on one belt end will fit freely between the loops on the other belt end, as shown in Fig. 1. These loops, which are bent into semicylindrical form, may be made of sheet metal with flat shanks $c$, adapted to embrace the belt ends on opposite sides thereof, and having points or prongs $d$, adapted to pass through the belt and to be clenched therein, as shown. The several loops or their shanks for each end of the belt, may be connected by a cross bar (not shown) formed integrally therewith. The construction of the loop members of the hinge is however, immaterial, and may be varied, it being necessary only to provide the belt ends with alternating hinge loops of proper form to coöperate with a loose hinge pin of the construction hereinafter described. The diameter of the semicylindrical loops transversely to the belt is somewhat less than their length, or the distance between them and the ends of the belt to which they are attached, as clearly shown in Fig. 2.

The hinge pin which constitutes the essential distinguishing feature of the present invention is composed of two longitudinal segments $e$, having rocker bearings of convex or other suitable form on their inner adjoining sides, which are adapted to engage with each other along or close to the axis of the pin. On their outer sides they are formed with semicylindrical seats $f$, for the hinge loops $a$ and alternating raised portions or lugs $g$. These segments may be expeditiously and cheaply made of wire or long rods formed into the desired cross sectional shape, and then cut to the required lengths, according to the width of the loop members or belts with which they are to be used. When they are cut to the required length, two segments are assembled, as shown in Fig. 1, with their inner convex sides or rocker bearings together, and the loop seats $f$ on the outer side of each segment, opposite the lugs $g$ on the outer side of the other segment. When so assembled they are inserted endwise through the loops $a$, the ends of the belt to which the loops are attached being drawn together so as to permit the lugs to pass through them into place. The shortest diameter of the composite pin passing through the two segments transversely to their rocker faces between loop seats on their outer sides, is greater than the longest diameter of either segment perpendicular thereto, and greater than the internal diameter of the loops transversely to the belt, so that the pin must be inserted and will be retained in the loops in approximately the position it is shown in Figs. 1 and 2, with the rocker bearing faces on the in or adjoining sides of the segments approximately perpendicular to or transverse to the belt. The tension on the belt exerted through the hinge loops $a$ in opposite directions and on opposite sides of the pin holds the loops in engagement with the seats $f$ between the intervening lugs $g$ and thus securely retains both segments of the pin, even if either or both of them should be broken into two or more parts, in place, and preventing accidental separation of the belt ends. Whenever it is desired to disconnect the fastening and separate the belt ends, the pin can be easily driven lengthwise out of the hinge loops, with a punch or the like. The application and removal of belts and their adjustment to take up slack, is thus greatly facilitated.

In use, either segment of the pin rocks on the other segment without turning in the hinge loops in which it is seated, when the belt is flexed in passing around a pulley. Friction and wear on the pin and loops are thus avoided, and the pin having its greatest diameter in the direction of the strain on the belt, is stronger and will last much longer than an ordinary one-piece metal or rawhide pin of corresponding area in cross section, besides, as above stated, facilitating connection and disconnection of the belt ends, and avoiding accidental separation thereof.

Various modifications in the minor details of construction and arrangement of parts of the fastening may be made within the principle and scope of the invention as defined in the appended claims.

I claim:

1. A belt fastening comprising hinge loops attachable alternately to the ends of a belt and elongated lengthwise of the belt and a hinge pin removably fitted in said loops and composed of two longitudinal segments having rocker bearings on their inner sides and bearings fitting said loops on their outer sides, the diameter of the composite pin lengthwise of the belt between loop bearings on opposite sides thereof being greater than the diameter of the segments and the internal diameter of the loops transversely to the belt.

2. A hinge pin for belt fastenings composed of two longitudinal segments having rocker bearings on their inner adjoining sides and semicylindrical bearings on their opposite outer sides, the diameter of the composite pin between bearings on opposite sides thereof being greater than the diameter of the segments transversely thereto.

3. A belt fastening comprising hinge loops attachable alternately to the ends of a belt and elongated lengthwise of the belt and a hinge pin removably fitted in said loops and composed of two longitudinal segments having rocker bearings on their inner adjoining sides and semicylindrical bearings on their outer sides fitting said loops and alternating with raised lugs adapted to confine the segments in place lengthwise in said lugs under working conditions, the diameter of the composite pin between opposite bearings on the outer sides of the segments being greater than the diameter of the separate segments transversely thereto and adapted to prevent the segments from turning in the loops out of proper working position.

4. A hinge pin for belt fastenings composed of two longitudinal segments having rocker bearings on their inner sides and loop seats alternating with raised lugs on their outer sides, the shortest diameter of the composite pin passing through said segments transversely to their inner rocker bearing faces being greater than the longest diameter of the segments transversely to the belt.

5. The belt fastening comprising two members attachable to the ends of a belt and each having a series of approximately semicylindrical hinge loops elongated lengthwise of the belt and alternating with those of the other member, and an approximately cylindrical loose hinge pin detachably connecting said members and composed of two segments having rocker bearings on their inner sides and approximately semicylindrical bearings on their outer sides fitting said loops and provided with raised lugs alternating with the semicylindrical bearings and adapted to engage the loops and prevent longitudinal displacement of the segments in said members when the fastening is subjected to tension lengthwise of the belt.

In witness whereof I hereto affix my signature in presence of two witnesses.

GEORGE E. PURPLE.

Witnesses:
A. R. REACH,
P. S. RINILTO.